United States Patent
Schuemann

(10) Patent No.: US 11,276,991 B2
(45) Date of Patent: Mar. 15, 2022

(54) CONTROL ROD WITH COMPENSATION ELEMENT

(71) Applicant: SIEMENS AKTIENGESELLSCHAFT, Munich (DE)

(72) Inventor: Ulf Schuemann, Dallgow-Doeberitz (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 16/956,686

(22) PCT Filed: Nov. 28, 2018

(86) PCT No.: PCT/EP2018/082783
§ 371 (c)(1),
(2) Date: Jun. 22, 2020

(87) PCT Pub. No.: WO2019/120909
PCT Pub. Date: Jun. 27, 2019

(65) Prior Publication Data
US 2020/0328581 A1 Oct. 15, 2020

(30) Foreign Application Priority Data
Dec. 21, 2017 (DE) .............................. 102017223548

(51) Int. Cl.
*H01H 33/662* (2006.01)
*H01H 33/666* (2006.01)
(Continued)

(52) U.S. Cl.
CPC .......... *H02B 13/0354* (2013.01); *H01B 3/56* (2013.01); *H01H 33/666* (2013.01); *H01H 33/66238* (2013.01)

(58) Field of Classification Search
CPC ......... H01H 33/66238; H01H 33/6606; H01H 33/666; H01H 2033/66246;
(Continued)

(56) References Cited

U.S. PATENT DOCUMENTS 5,191,180 A    3/1993  Kitamura et al.
8,723,070 B2 *  5/2014  Yoshida ............. H02B 13/0354
                                                      218/134
(Continued)

FOREIGN PATENT DOCUMENTS

CN    101331573 A    12/2008
CN    102866596 A    1/2013
(Continued)

*Primary Examiner* — William A Bolton
(74) *Attorney, Agent, or Firm* — Laurence A. Greenberg; Werner H. Stemer; Ralph E. Locher

(57) ABSTRACT

A control rod system has a control or drive rod and at least one compensation element for vacuum interrupters, in particular for gas-insulated switchgear. The at least one compensation element has at least one hermetically sealed bellows. The at least one hermetically sealed bellows is either connected to the drive rod at at least one point, or is connected to or can be coupled to the drive rod via at least one engagement device and the engagement device is connected or can be connected to the at least one compensation element in a fixed or engaging manner.

12 Claims, 2 Drawing Sheets

(51) Int. Cl.
   *H01B 3/56*     (2006.01)
   *H02B 13/035*   (2006.01)

(58) Field of Classification Search
   CPC ............ H02B 13/0354; H02B 13/0352; H02B 13/045; H02B 13/055
   USPC ..... 218/139, 10, 3, 42, 68, 70, 97, 114, 118, 218/134, 135, 138, 155, 13; 335/201
   See application file for complete search history.

(56) References Cited

U.S. PATENT DOCUMENTS

| | | | |
|---|---|---|---|
| 8,916,059 B2* | 12/2014 | Glasmacher | H02B 13/055 252/67 |
| 8,963,037 B2* | 2/2015 | Nakada | H01H 33/42 218/120 |
| 9,136,674 B2* | 9/2015 | Ohtsuka | H02B 13/0354 |
| 9,472,356 B2* | 10/2016 | Matsunaga | H02B 13/0354 |
| 2006/0196274 A1 | 9/2006 | Egermeier et al. | |
| 2012/0103941 A1* | 5/2012 | Nakayama | H02B 13/0356 218/134 |
| 2015/0244158 A1* | 8/2015 | Fukuoka | H02G 3/22 218/139 |

FOREIGN PATENT DOCUMENTS

| | | |
|---|---|---|
| CN | 204215949 U | 3/2015 |
| CN | 105590787 A | 5/2016 |
| CN | 205943927 U | 2/2017 |
| DE | 4123710 A1 | 1/1992 |
| DE | 19517287 A1 | 11/1996 |
| KR | 101060780 B1 | 8/2011 |

* cited by examiner

CONTROL ROD WITH COMPENSATION ELEMENT

BACKGROUND OF THE INVENTION

Field of the Invention

The invention relates to a drive rod having at least one compensation element for a vacuum interrupter, in particular for gas-insulated switchgears and a gas-insulated switchgear having a drive rod having at least one compensation element for vacuum interrupters.

In the prior art, vacuum interrupters in gas-insulated switchgears are operated in a pressurized gas container. The kinematic contact separation takes place by means of a drive, which is or can be arranged outside the container, wherein the drive is effected via a drive rod and the drive rod is guided into the interior region of the gas container via a volume-neutral connection/feed-through. If the drive is arranged in the gas container, this arrangement essentially acts in the same way. In such an arrangement, an additional volume-changing work has to be undertaken for contact separation, since the movement of the moving contact for the contact separation of the vacuum interrupter takes place via a bellows, which does not constitute a volume-neutral connection/feed-through. The movement of the bellows of the vacuum interrupter therefore changes the gas volume in the gas container and in the vacuum interrupter.

If the overpressure in the gas container is relatively low, for example 0.5 to 1 bar overpressure in relation to the normal pressure outside the gas container, relatively little volume-changing work needs to be performed. The use of axial feed-throughs, with bellows, through the gas container wall results in a reduction in the necessary volume-changing work during a switching process.

SUMMARY OF THE INVENTION

The object of the invention is to now provide an arrangement which overcomes the disadvantages of the prior art and, in particular, reduces, compensates or overcompensates the volume-changing work.

This object is achieved by the independent claim and the claims dependent thereon.

The exemplary embodiment relates to a drive rod having at least one compensation element for vacuum interrupters, wherein the at least one compensation element is formed from at least one hermetically sealed bellows and the at least one bellows is either connected to the drive rod at at least one point or is connected to the drive rod via at least one engagement means and the engagement means is connected or can be connected to the at least one compensation element in a fixed or engaging manner, and the at least one bellows can be connected to a gas container through which the drive rod is guided or can be guided.

The engagement means are therefore coupling means, which enable either a fixed connection or a releasable connection or simply an abutting connection, for example also in conjunction with a further engagement element.

It is preferred that the at least one compensation element is formed from two bellows surrounding the drive rod.

In particular, it is preferred that the bellows surrounding the drive rod are sealed together in a hermetically tight manner so that they form an annular, enclosed volume. This volume, like the other volumes of the compensation elements, can be changed by changing the position of the drive rod. Only resulting forces in the direction of the longitudinal axis of the drive rod are generated and/or compensated by the compensation element.

It is also preferred that two or more compensation elements are arranged around the drive rod in such a way that only resulting forces in the direction of the longitudinal axis of the drive rod are generated by the compensation element. In particular, such an arrangement prevents that forces perpendicular to the longitudinal axis of the drive rod act on the drive rod.

It is also preferred that three compensation elements are arranged around the drive rod in such a way that only resulting forces in the direction of the longitudinal axis of the drive rod are generated by the compensation elements.

In particular, it is preferred that three compensation elements are arranged symmetrically around the longitudinal axis of the drive rod.

It is furthermore also preferred that the compensation elements are arranged on the vertices of an equilateral triangle, and the longitudinal axis of the drive rod extends perpendicularly through the center point of the triangular arrangement.

It is also preferred that the at least one compensation element is connected to the drive rod in a fixed manner or can be coupled to the drive rod in an engaging manner via
a), an annular engagement means, or
b) a disk-shaped engagement means.

In this context, can be coupled in an engaging manner means that the engagement means engages on or in a contact means in such a way that, at least during a switching movement of the drive rod, this is at least partially coupled to the compensation element and the volume-changing work to be performed is influenced in this way.

The partial coupling can be realized, for example, in such a way that the drive rod is only coupled to the at least one compensation element during part of the switching movement.

It is also preferred that the at least one compensation element has a gas pressure in the interior which is comparable to that in the vacuum interrupter. In this context, comparable means that the pressures in the compensation element and in the vacuum interrupter differ from one another by no more than 0.25 bar, preferably no more than 0.1 bar, in particular preferably by no more than 0.01 bar. This means, for example, that a pressure in the compensation element of 0.1 bar, with a pressure of $10^{-5}$ mbar or less in the vacuum interrupter, fulfills this requirement. Alternatively, the at least one compensation element can also be filled with a gas which has a higher pressure than the vacuum interrupter and therefore generates and/or compensates resulting forces, in particular in the direction of the longitudinal axis of the drive rod.

It is also preferred that the at least one compensation element compensates at least some of the forces which act on the drive rod from the vacuum interrupter bellows, at least in one movement direction of the drive rod.

It is also preferred that the at least one compensation element, upon the movement of the drive rod, performs a volume-changing work, wherein the volume-changing work of the at least one compensation element is calculated according to:

$$\Delta W = \Delta p * A * S,$$

where $\Delta p$ is the pressure difference between the gas pressure in the compensation element and the gas pressure of the gas surrounding the compensation element and A is the area of the compensation element perpendicular to the movement direction of the drive rod and S is the stroke of the drive rod during switching procedures.

A further exemplary embodiment relates to a gas-insulated switchgear having a drive rod according to one of the above exemplary embodiments, wherein the drive rod is guided into a gas container by means of a feed-through and the drive rod is coupled to a moving contact of the vacuum interrupter in such a way that the moving contact can be moved via the drive rod.

It is also preferred that the gas in the gas container consists of one or more gases of SF6, one more ketones, in particular fluoroketones, a nitrile and/or a siloxane and/or nitrogen and/or oxygen or at least contains one or more of these gases, in particular as an insulating gas and/or switching gas.

The inventive subject matter is explained in more detail below, with reference to the figures.

DETAILED DESCRIPTION OF THE INVENTION

Figure 1:
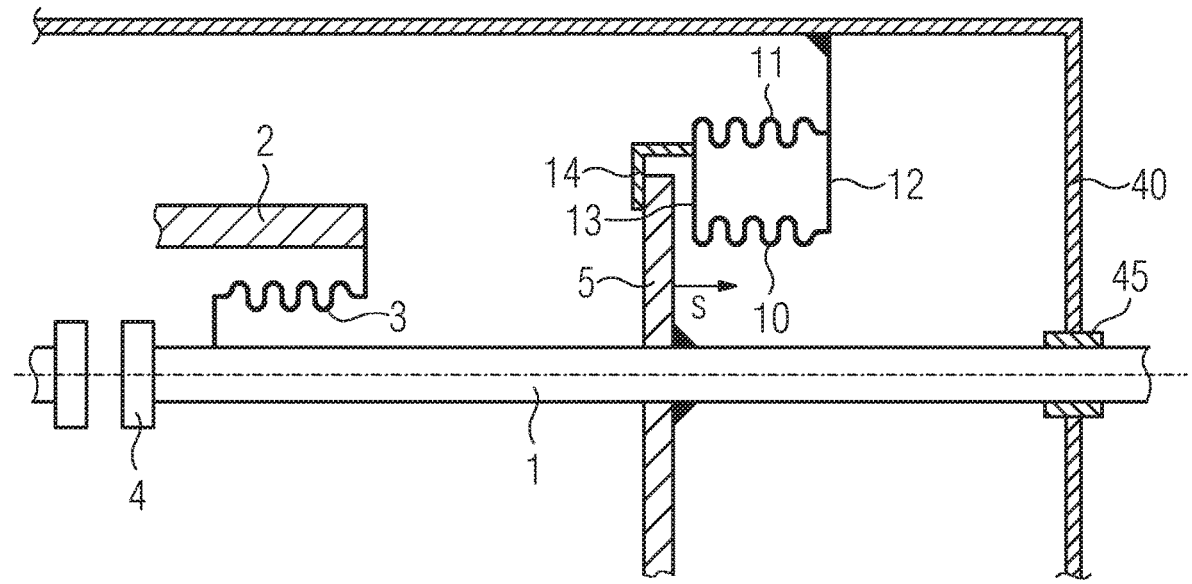
FIG. 1: a schematic sectional illustration through a gas container with a drive rod according to the invention, a vacuum interrupter and a compensation element.

FIG. 1 shows a section through a gas container 40 with an inventive drive rod 1 for moving the moving contact 4 of a vacuum interrupter 2. The moving contact 4 of the vacuum interrupter 2 is coupled to the drive rod 1 via a bellows 3 which is sealed in a gas-tight manner. The drive rod 1 leads out of the gas container 40 via a feed-through 45.

To at least partially compensate the volume-changing work in at least one movement direction of the drive rod 1, a compensation element 10 is present in FIG. 1, which compensates the volume change which takes place as a result of a movement of the vacuum interrupter bellows 3.

The compensation element 10 has, in the example shown, a first bellows seal 12 and a second bellows seal 13, which seal the bellows 11 and thereby form a hermetically closed compensation element 10. The compensation element 10 is connected to the gas container 40 by one side, here by the side which has the first bellows seal 12. The coupling of the compensation element 10 to the drive rod 1 takes place via an engagement means 5, which is fastened to the drive rod 1 in a fixed manner. In the case shown here, the engagement means 5 is not connected to the compensation element 10 in a fixed manner; instead, the engagement means 5 engages in an engagement element 14 and therefore, upon a movement of the drive rod 1, results in a change in the volume of the compensation element 10, which counteracts the volume change caused by the vacuum interrupter bellows 3.

The pressure within the compensation element 10 and within the vacuum interrupter 2 is preferably identical or differs only slightly from the said pressure. A slight difference is present if the pressure or pressures in the compensation element and in the vacuum interrupter differ from one another by no more than 0.25 bar, preferably no more than 0.1 bar, in particular preferably by no more than 0.01 bar. This means, for example, that a pressure in the compensation element of 0.1 bar, with a pressure of 10^-5 mbar or less in the vacuum interrupter, fulfills this requirement.

Figure 2:
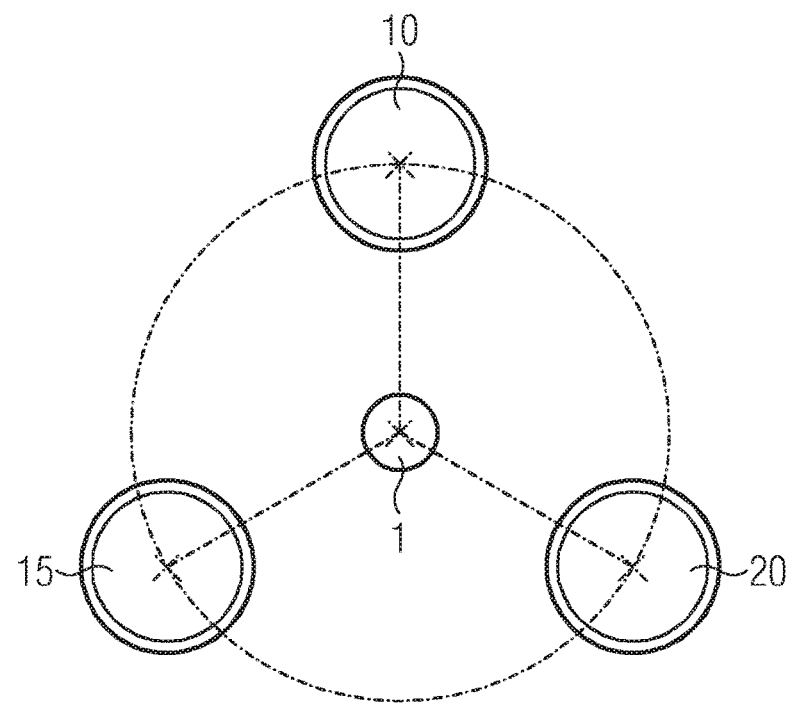
FIG. 2: a front view of a drive rod according to the invention with three compensation elements.

FIG. 2 shows, for a horizontally installed switch rod, a front view of the switch rod 1 with three compensation elements 10, 15, 20 which are arranged around the switch rod. As a result of the symmetrical arrangement (shown here) of the three compensation elements 10, 15, 20 around the drive rod 1, additional forces which are directed perpendicularly to the longitudinal axis of the drive rod 1 do not act on the switch rod as a result of the compensation elements.

Figure 3:
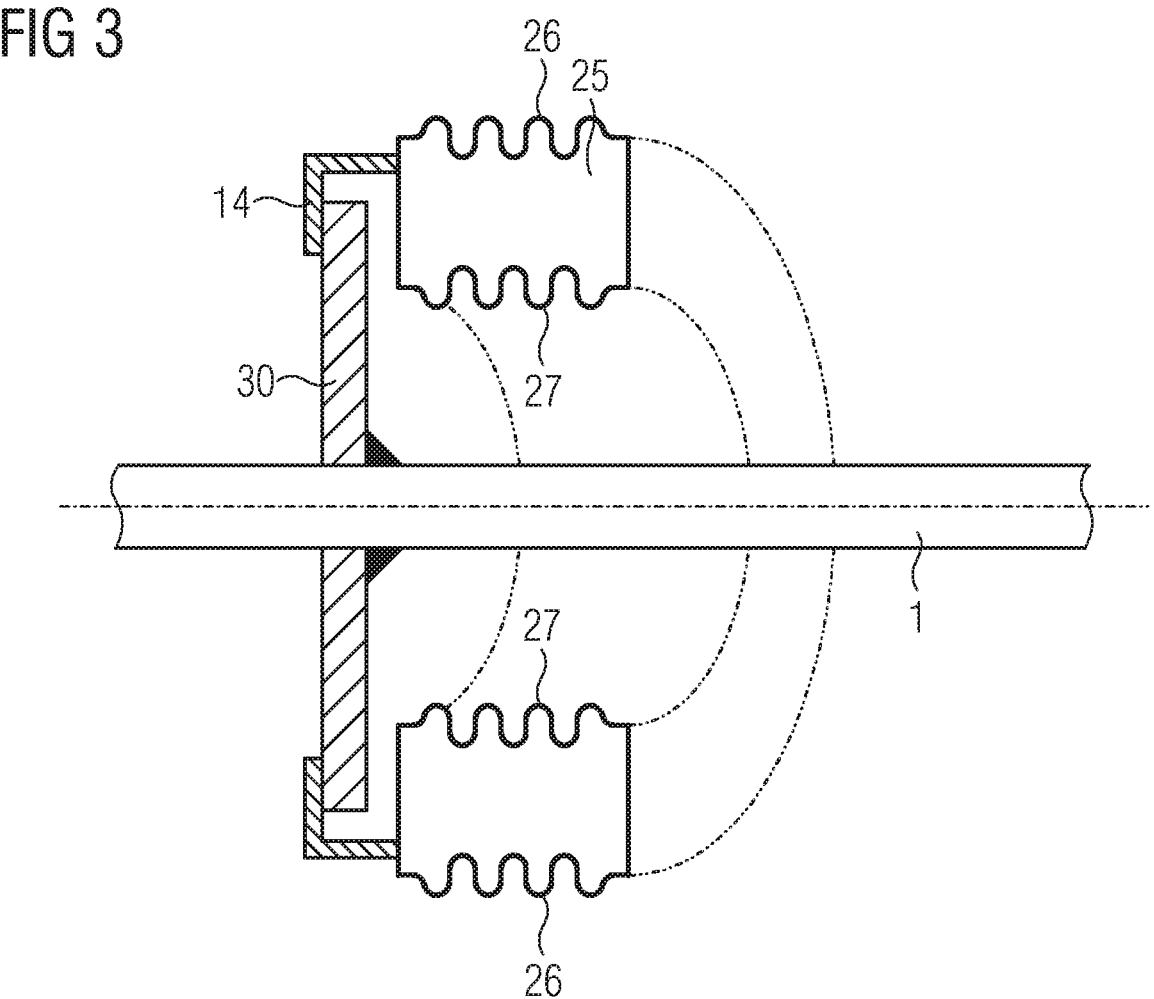
FIG. 3: a sectional illustration through a drive rod with a compensation element according to the invention.

FIG. 3 shows a variation of a compensation element 25, which is formed from a first bellows 26 surrounding the drive rod 1 and a second bellows 27 surrounding the drive rod 1. The compensation element 25 is also hermetically sealed, similarly to the compensation element 10 in FIG. 1. The compensation element 25 of FIG. 3 has an annular structure, wherein one side, again analogously to FIG. 1, is fastened, or will be fastened, to the gas container 40, and the second side is coupled to the drive rod 1 via an engagement means 30, which, in this example, is connected to the drive rod 1 in a fixed manner. The coupling in FIG. 3 again takes place via an engagement element 14; alternatively, the engagement element 14 can, however, also be connected to the engagement means 30 or the drive rod 1 in a fixed manner or the drive rod 1 or the engagement means 30 can be connected directly to the compensation element 25.

The invention claimed is:

1. A drive rod system for a vacuum interrupter, comprising:
   a drive rod;
   at least one compensation element formed from at least one hermetically sealed bellows, said at least one compensation element fixedly connected to said drive rod or only coupled to said drive rod during part of a switching movement of said drive rod; and
   said at least one hermetically sealed bellows configured to be connected to a gas container through which said drive rod is guided or can be guided;
   wherein said at least one compensation element compensates at least some of forces which act on said drive rod from vacuum interrupter bellows, at least in one movement direction of said drive rod; and
   wherein said at least one compensation element, upon a movement of said drive rod, performs a volume-changing work, wherein the volume-changing work of said at least one compensation element is calculated according to:

$$\Delta W = \Delta p * A * S,$$

where:
   $\Delta p$ is a pressure difference between a gas pressure in said compensation element and a gas pressure of a gas surrounding said at least one compensation element;
   A is an area of said at least one compensation element perpendicular to the movement direction of the drive rod; and
   S is a stroke of said drive rod during switching procedures.

2. The drive rod system according to claim 1, wherein said at least one hermetically sealed bellows is one of two bellows surrounding said drive rod and forming said at least one compensation element.

3. The drive rod system according to claim 1, wherein said at least one compensation element is one of at least two compensation elements disposed around said drive rod in such a way that resulting forces are generated by said at least two compensation elements in a direction of a longitudinal axis of said drive rod.

4. The drive rod system according to claim 1, wherein said at least one compensation element is one of three compensation elements disposed around said drive rod in such a way that resulting forces are generated by said at least three compensation elements in a direction of a longitudinal axis of said drive rod.

5. The drive rod system according to claim 4, wherein said three compensation elements are disposed symmetrically around the longitudinal axis of said drive rod.

6. The drive rod system according to claim 1, wherein: said at least one compensation element is only coupled to said drive rod during part of the switching movement of said drive rod.

7. The drive rod system according to claim 1, wherein: said at least one compensation element has an interior filled with a gas at a pressure selected from the group consisting of a gas pressure comparable to a gas pressure in the vacuum interrupter and a gas pressure higher than the gas pressure the vacuum interrupter.

8. A gas-insulated switchgear, comprising:
a gas container having a feed-through and a moving contact;
a vacuum interrupter containing a drive rod and at least one compensation element formed from at least one hermetically sealed bellows, said at least one compensation element fixedly connected to said drive rod or only coupled to said drive rod during part of a switching movement of said drive rod; and
said at least one hermetically sealed bellows is connected to said gas container through which said drive rod is guided, said drive rod being guided into said gas container by means of said feed-through and said drive rod is coupled to said moving contact of said vacuum interrupter in such a way that said moving contact can be moved via said drive rod;
wherein said at least one compensation element compensates at least some of forces which act on said drive rod from vacuum interrupter bellows, at least in one movement direction of said drive rod; and
wherein said at least one compensation element, upon a movement of said drive rod, performs a volume-changing work, wherein the volume-changing work of said at least one compensation element is calculated according to:

$\Delta W = \Delta p * A * S,$ where:
Δp is a pressure difference between a gas pressure in said compensation element and a gas pressure of a gas surrounding said at least one compensation element;
A is an area of said at least one compensation element perpendicular to the movement direction of the drive rod; and
S is a stroke of said drive rod during switching procedures.

9. The gas-insulated switchgear according to claim 8, further comprising at least one gas containing at least one of SF6, at least one ketone, a nitrile, a siloxane, nitrogen and oxygen and is present in said gas container as an insulating gas and/or a switching gas.

10. The gas-insulated switchgear according to claim 9, wherein said at least one ketone is a fluoroketone.

11. A drive rod system for a vacuum interrupter, comprising:
a drive rod;
at least one compensation element formed from at least one hermetically sealed bellows, said at least one compensation element fixedly connected to said drive rod or only coupled to said drive rod during part of a switching movement of said drive rod; and
said at least one hermetically sealed bellows configured to be connected to a gas container through which said drive rod is guided or can be guided;
wherein said at least one compensation element is one of three compensation elements disposed around said drive rod in such a way that resulting forces are generated by said at least three compensation elements in a direction of a longitudinal axis of said drive rod.

12. The drive rod system according to claim 11, wherein said three compensation elements are disposed symmetrically around the longitudinal axis of said drive rod.

* * * * *